United States Patent Office 3,365,468
Patented Jan. 23, 1968

3,365,468
UREA AND/OR THIOUREA-ALDEHYDE
CONDENSATION PRODUCTS
Hans Feichtinger, Dinslaken, Germany, assignor to Ruhrchemie Aktiengesellschaft, Oberhausen-Holten, Germany, a corporation of Germany
No Drawing. Filed Apr. 28, 1964, Ser. No. 363,280
Claims priority, application Germany, May 4, 1963,
R 35,096
8 Claims. (Cl. 260—345.7)

This invention relates to reaction products of urea or thiourea and an aldehyde, and to processes for their preparation.

It is well known in the art, that aldehydes condense with urea and thiourea under the influence of acid catalysts to produce straight-chain or cyclic compounds. In the resulting reaction products, the urea-radical can be positioned in the chain as well as in and/or at the heterocyclic ring system. As urea is substantially insoluble in aldehydes, the reactants were hitherto brought to reaction by means of solvents, as for instance water or alcohols. In most cases sulfuric or hydrochloric acid were used as condensation initiators. It had also been suggested in the prior art, to boil the reaction mixture for many hours, in order to conduct the reaction with satisfactorily high yields of condensation products.

The known process has its disadvantages due to the fact that serious difficulties are encountered in carrying the same out, as, owing to the solvent system, long reaction times are necessary and further the solvents and condensation initiators must be separated from the resulting urea-aldehyde-condensation products, which thereafter must be purified by further chemical or physical operations.

An object of the invention is an improved process for the production of urea and thiourea-aldehyde-condensation products.

Another object of the invention is a process for the direct production of urea and thiourea-aldehyde-condensation products.

Still another object of the invention is a process for the production of urea and thiourea-aldehyde-condensation products in the absence of any solvents.

These and other objects are attained in accordance with the invention by contacting the surface of a continually agitated intimate physical mixture of at least one compound of the group of urea and thiourea with at least one aldehyde of the group of alkanals, alkenals, aromatic and heterocyclic aldehydes having up to 18 carbon atoms in the molecule with a catalytic amount of a gaseous hydrogen halide and preferably gaseous hydrogen chloride.

While preferably gaseous hydrogen chloride is used there can also be used gaseous hydrogen bromide or gaseous hydrogen fluoride.

With the process according to the invention, it has for the first time been made possible to effect the reaction of two or more of the said compounds capable of forming condensation products with each other, without the use of solvents. The process according to the invention may even be carried out to effect the reaction of compounds both of which are present in solid phase.

The molar proportions of the two reaction components—i.e., urea or thiourea and aldehyde—which are not soluble in one another, may vary over a wide range. It is however preferred to employ the urea component and the aldehyde component in a molar ratio of between 2:1 and 1:2.

The aldehydes suitable for use in accordance with the invention may be saturated or may be mono- or poly-unsaturated compounds. It has been found that especially advantageous results are obtained when as aldehyde component there is employed, for instance, propionaldehyde, iso- or n-butyraldehyde, valeraldehyde, oenanthaldehyde, paraformaldehyde, 3,5,5-trimethyl-hexanal-(1), benzaldehyde, furfural, 2-formyl-2,3-dihydropyrane, acrolein, crotonaldehyde and the like. Mixtures of aldehydes, as for instance aldehyde mixtures obtained by the so-called "oxo-process," may also be used advantageously as starting materials for reaction with the urea or thiourea.

The catalytic, active hydrogen halide is used in amounts varying between $\frac{1}{10}$ to $\frac{1}{1000}$ mole per mole of the urea component.

The process may be conducted at ambient temperature in a condensed system.

The process according to the invention can be carried out in a number of ways. Thus, the urea component can simply be mixed with the aldehyde component and small amounts of gaseous hydrogen halide, preferably hydrogen chloride, supplied onto the surface of the resulting admixture in stages. Thereby an instantaneous interaction occurs under solidification of the reaction mixture. In the case of the condensation of isobutyraldehyde with urea, the reaction begins after about 5 to 10 seconds and is completed after 1 to 2 minutes. Depending on their composition, the other aldehydes react equally or less rapidly.

The condensation proceeds with evolution of heat.

Owing to the rapid course of the condensation reaction, the process according to the invention is preferably carried out continuously. The continuous reaction is effected by introducing the urea component and the aldehyde reactant into a suitable mixing device, and the surface of the admixture exposed to the hydrogen halide. Preferably, this takes place in a closed system. The hydrogen halide gas is conveniently introduced continuously. Most advantageously, the reaction mixture is processed in a ball mill, milling devices of the screw type or other milling or mixing devices known in the art, the solid reaction product being continuously drawn off in such amounts that the amount of the reaction mixture present in the device remains substantially constant throughout the process.

The process according to the invention yields light colored to pure white solid products, which can easily be comminuted to a dust-like powder. These powders may be technically used as such without the necessity of being worked up any further.

The powdery reaction products can be freed from non-reacted urea or thiourea by washing with water.

The reaction products may be employed for many purposes as, for instance, as intermediate products for further organic synthesis.

Additionally, the urea or thiourea-aldehyde condensation products obtained by the process according to the invention may be employed with particular advantage as plant nutrients or fertilizers, since they can be used for maintaining a urea depot in the soil, which will not become leached by water and which as a depot makes urea available for the plants over a long time.

In order that those skilled in the art better may understand how the present invention may be carried into effect, the following examples are given by way of illustration and not by way of limitation:

*Example 1*

40.0 g. of finely divided dry urea and 25.0 g. of freshly distilled isobutyraldehyde were intimately admixed by crushing in a mortar having a 17 cm. diameter. During grinding, slight amounts of gaseous hydrogen chloride were delivered for a short time to the agitated surface of the admixture. After about 5 to 10 seconds, the mixture began to compact and had solidified after 1 to 2 minutes into a rigid mass, which was comminuted to a dust-like white powder by further crushing with the pestle. The powder was freed of non-reacted urea by suspending the same in water, filtering and drying under vacuum. There were thus obtained 30.2 g. of a white powder having a melting point of 198 to 200° C. (decomposition). The nitrogen content was 30.5% by weight.

Example 2

20.0 g. urea and 24.0 g. isobutyraldehyde were treated and the reaction product worked up as described in Example 1. 23.0 g. of a white powder having a melting point of 191 to 197° C. (decomposition) and a nitrogen content of 29.8% by weight were thereby obtained.

Example 3

In the same manner as set out in Example 1, 20.0 g. urea and 48.0 g. isobutyraldehyde were reacted together and the reaction mixture worked up. 33.5 g. of a white powder having a melting range of 130 to 166° C. (decomposition) and a nitrogen content of 23.4% by weight were thereby obtained.

Example 4

In an analogous manner 40.0 g. urea and 74.0 g. acrolein were reacted together to produce 26 g. of a white powder having a melting range of 78 to 100° C. and a nitrogen content of 25.5% by weight.

Example 5

40.0 g. urea were reacted with 76.5 g. propionaldehyde and the reaction product thus obtained worked up as described above. 39 g. of a white powder having a nitrogen content of 24.6% by weight and a melting range of 97 to 122° C. (decomposition) were obtained.

Example 6

20.0 g. urea were reacted with 24.0 g. butyraldehyde as described above. After washing with ice cold water and drying under vacuum, 26.2 g. of a white powder having a nitrogen content of 23.8% by weight were obtained.

Example 7

35.0 g. benzaldehyde and 20.0 g. urea were reacted in the manner described above, producing, after washing with water and drying, 44.3 g. of a white, solid product having a nitrogen content of 20.1% by weight and a melting range of 208 to 225° C. (decomposition).

Example 8

47.3 g. 3,5,5-trimethyl-hexanal-(1) were reacted with 20.0 g. urea and the reaction mixture worked up to yield 54.2 g. of a white, crystalline product having a nitrogen content of 14.4% by weight and a melting range of 132 to 165° C. (decomposition).

Example 9

40.0 g. urea were reacted with 32.0 g. of freshly distilled furfurol and the resulting product worked up as described in Example 1. Purification was effected by washing with water and carefully drying. There were obtained 44.8 g. of a brown powder having an 18.8% by weight nitrogen content.

Example 10

37.0 g. 2-formyl-2,3-dihydropyrane were added to 20.0 g. urea in a mortar under stirring with a pestle. The mixture was thereafter treated as described in Example 1. After washing and drying, 40.2 g. of a yellowish powder having a nitrogen content of 11.0% by weight were obtained.

Example 11

40.0 g. urea were reacted with 46.5 g. crotonaldehyde and worked up as described in Example 1. 9 g. of a brownish powder having a melting range of 201 to 229° C. (decomposition) and a nitrogen content of 22.7% by weight were obtained.

Example 12

Following the procedure of Example 1, 38.0 g. thiourea were reacted with 20.0 g. isobutyraldehyde to produce after washing with water and drying 10 g. of a white powder having a melting range of 101 to 155° C. and a nitrogen content of 30.9% by weight.

Example 13

In the manner described in Example 1 38.0 g. thiourea were reacted with 20.0 g. n-butyraldehyde and worked up to produce 19.6 g. of a white powder having a melting range of 145 to 151° C. and a nitrogen content of 24.7% by weight.

Example 14

180 g. urea were finely ground in a milling device equipped with a twin screw arrangement. Thereafter 119 g. isobutyraldehyde were introduced simultaneously with gaseous hydrogen chloride, which had been dried with concentrated sulfuric acid. The hydrogen chloride was supplied continuously at a constant rate of 5 bubbles/second. Following 15 minutes of treatment, the paste-like reaction mixture had solidified, and it was comminuted to a very fine powder by further grinding. After washing with water and drying, 210 g. of a white powder having a melting range of 188 to 198° C. (decomposition) and a nitrogen content of 30.5% by weight were recovered.

Example 15

180 g. urea were reacted with 92.0 g. acrolein within one hour in the milling device described in Example 14, while continuously introducing a stream of gaseous hydrogen chloride at a constant rate of 3 bubbles/second. After another hour, the initial paste-like substance had completely solidified and was then ground to a white powder, which yielded after washing with ice cold water and drying 171 g. of a light brownish powder having a nitrogen content of 24.6% by weight and a melting range of 126 to 152° C. (decomposition).

Example 16

According to the procedure described in Example 1, an intimate mixture of 180.0 g. urea and 45.0 g. solid paraformaldehyde were stirred using a pestle, while a weak stream of gaseous hydrogen chloride was directed onto the surface of the two reactants present in solid phase. After 5 minutes the reaction mixture was transformed to a paste-like mass, which solidified to form a crystalline product in about 3 to 4 hours. The reaction product so obtained was crushed in a mortar producing 214 g. of a white powder having a nitrogen content of 34.3% by weight.

Example 17

In the same manner as described in Example 16, 180.0 g. of finely crushed urea were reacted with 90.0 g. paraformaldehyde. The reaction started after a few minutes and yielded 230.0 g. of a white crystalline solid having a nitrogen content of 28.6% by weight.

Similar results can be obtained, when in the process described in the examples hydrogen bromide or hydrogen fluoride is used instead of hydrogen chloride.

Example 18

In the manner described in Example 1 40.0 g. finely divided urea and 160.0 g. iso-hexadecanal (boiling point 160–167° C.) were intimately admixed by crushing. The isohexadecanal had been produced by hydroformylation of a $C_{15}$-olefin, obtained by cracking. Thereafter about 250 ccm. hydrogen bromide were slowly injected against the surface of the continually agitated paste like admixture of the reactants. After few minutes the reaction mixture had solidified and it was comminuted to a dust like powder by further crushing with the pestle. The nitrogen content of the reaction product was 9.1% by weight.

I claim:
1. A process for the production of condensation compounds of a member selected from the group consisting of urea and thiourea with an aldehyde, which comprises injecting a catalytic amount of a gaseous hydrogen halide against the surface of an intimate physical admixture of a member selected from the group consisting of urea and thiourea with an aldehyde selected from the group consisting of alkanals, alkenals, benzaldehyde and monocyclic, mono-oxygen containing heretocyclic aldehydes having a total carbon atom content of up to 18, while continuously agitating said admixture and recovering the condensation product thus produced.

2. A process according to claim 1, which comprises employing said urea group member and said aldehyde group member in a molar ratio of between 2:1 and 1:2.

3. A process according to claim 1, which comprises employing said gaseous hydrogen halide in an amount ranging between $\frac{1}{10}$ to $\frac{1}{1000}$ mole per mole of the urea component.

4. A process according to claim 1, which comprises effecting the condensation at ambient temperature in a condensed system.

5. A process according to claim 1 wherein said gaseous hydrogen halide is hydrogen chloride.

6. A process according to claim 1, which comprises effecting said injecting stagewise.

7. A process according to claim 1, which comprises effecting said injecting continuously.

8. A process according to claim 1, wherein said admixture is a mixture of solids.

References Cited

UNITED STATES PATENTS 2,305,620   12/1942   Kremers _____ 260—553

OTHER REFERENCES

Farbwerke: Chemical Abstracts, vol. 60, col. 11906 (1964) (abstract of Belgian Patent 629,255, published October 1963).

Vass: British Plastics, vol. 10 (1938), pp. 115–118.

ALEX MAZEL, *Primary Examiner.*

HENRY R. JILES, NICHOLAS RIZZO, *Examiners.*

J. H. TURNIPSEED, *Assistant Examiner.*

UNITED STATES PATENT OFFICE
CERTIFICATE OF CORRECTION

Patent No. 3,365,468                        January 23, 1968

Hans Feichtinger

It is certified that error appears in the above identified patent and that said Letters Patent are hereby corrected as shown below:

Column 6, line 18, after "Vass: British Plastics, Vol. 10 (1938), pp. 115-118." insert -- (Photocopy in Group 120, class 260-553) --.

Signed and sealed this 23rd day of September 1969.

(SEAL)
Attest:

Edward M. Fletcher, Jr.                     WILLIAM E. SCHUYLER, JR.
Attesting Officer                                Commissioner of Patents